United States Patent Office 3,741,888
Patented June 26, 1973

3,741,888
OXIDATIVE SWEETENING WITH A CALCINED COGELLED COMPOSITE OF SILICA AND IRON SALT IMPREGNATED WITH A COPPER SALT
Harold Beuther, Gibsonia, Sun W. Chun, Murrysville, Harry A. Hamilton, Natrona Heights, and Howard G. McIlvried, McCandless Township, Allegheny County, Pa., assignors to Gulf Research & Development Company, Pittsburgh, Pa.
No Drawing. Filed July 15, 1971, Ser. No. 165,785
Int. Cl. C10g 27/04
U.S. Cl. 208—191    10 Claims

ABSTRACT OF THE DISCLOSURE

Method of preparing a catalyst useful in the conversation of compounds containing a sulfhydril group (thiols) to disulfides, i.e. the so-called sweetening reaction. The catalyst comprises an inorganic amorphous polymer of silicon, oxygen and an iron group metal impregnated with a copper salt.

This invention relates to a sweetening process using a catalyst comprising silicon, oxygen and an iron group metal in chemical combination and impregnated with a copper salt.

BACKGROUND OF THE INVENTION

Thiols (mercaptans) are sulfur analogues of alcohols and contain an —SH (sulfhydril) group. Many petroleum fractions contain alkanethiols as minor constituents, and these thiols impart to such fractions and their distillates are objectionable odor and corrosiveness. Distillates containing such objectionable sulfur derivatives are known as "sour" distillates, and processes for oxidizing the thiols or sulfhydril containing compounds to less objectionable disulfides are known as sweetening processes. The sweetening process is believed to be an oxidative coupling of two mercaptan molecules to give a disulfide, and thus the processes are normally run in the presence of a gas containing free molecular oxygen.

One of the most widely used catalysts for sweetening of sour petroleum fractions is copper chloride either in solution or on various supports. The use of sodium plubmite and caustic for sweetening are also known. More recently, a patent to Norman L. Carr et al., U.S. Pat. 3,491,020, suggests the use of a catalyst composite comprising an inorganic amorphous polymer of iron, silicon and oxygen for the selective oxidation of thiols to disulfides. All of the above processes suffer, however, from low throughput life before the catalyst is required to be regenerated.

A method of preparing an improved catalyst has now been discovered for the sweetening of sour hydrocarbons. This method comprises:

forming a solution of a substantially alkali metal-free silica sol and an iron group metal salt;
cogelling said solution to form a gelatinous precipitate;
drying said gelatinous precipitate;
optionally, calcining said gelatinous precipitate;
depositing from solution onto said dried precipitate from 0.1 to 15 weight percent of a copper salt;
and thereafter drying and calcining said copper containing precipitate, the amount of said alkali metal-free silica sol, said iron salt and said copper salt being such that the iron to silicon to oxygen atomic ratio in the final product is from about 1:2:5.5 to about 1:12:25.5, and the atomic ratio of the copper to iron group metal is from 0.01:1 to 0.45:1.

The catalyst of this invention is a high surface area cogelled composite comprising an iron group metal, silicon and oxygen chemically associated together in an inorganic amorphous polymer, which inorganic polymer has impregnated thereon from 0.1 to 15 weight percent of a copper salt such as copper chloride.

The inorganic polymer is prepared as follows. A dilute silica sol, preferably freshly prepared and substantially free of cationic impurities, is mixed with an aqueous solution of a compound capable of yielding iron group metal ions in solution, such as ferric chloride. By an "iron group metal" is meant iron, nickel and cobalt. Cogelation of the resulting mixture is accomplished by raising the pH with a suitable base such as ammonia. Once the cogel has set, it is washed to substantially remove any soluble salts which have formed and any residual base. To prepare this resulting cogel for catalytic use, it is dried and calcined. The copper salt is added usually by impregnation of the cogel after drying and preferably after the cogel has been calcined.

In the practice of the process of the instant invention it is desirable that the silica sol be free or substantially free of cationic impurities. By "cationic impurities" are meant metallic cations, especially the alkali metals as, for example, sodium, and the alkaline earth metals, as exemplified by calcium. When such metallic cations are present in the silica sol, they cannot readily be removed at later stages of the catalyst preparation and become included in the catalyst structure. Such metallic cations may tend to inhibit the desired catalytic properties of the final product.

A number of methods are available for the preparation of a cation-free dilute silica sol. Preferably, a dilute aqueous solution of a sodium silicate, such as water glass, is flowed, as by percolation or pumping, through a bed of protonated cation-exchange material to recover an effluent dilute silica sol substantially free of cationic impurities. Any soluble silicate can be used in this method, but the sodium silicate solutions commonly known in the art as "water glass" are preferred since they are inexpensive and readily available.

The silicate solution used in preparing the cation-free silica sol is dilute, preferably containing no more than the equivalent of about five weight percent silica and preferably between one and three percent silica. Solutions more or less concentrated can be employed satisfactorily, the upper and lower limits being that concentration which will pass through the ion-exchange column without gelling and that volume of liquid which can be conveniently handled, respectively.

Any solid cation-exchange material insoluble in water can be used to prepare the protonated silica sol. Cation-exchange resins of high cation-exchange capacity such as sulfonated phenol formaldehyde resins or divinylbenzene crosslinked sulfonated polystyrene resins, like Amberlite IR-120 (manufactured by Rohm and Haas), have given excellent results in the production of dilute silica sols. In every instance the ion-exchange material must be in acid form. It can be placed in this form by washing with a suitable strong acid such as sulfuric acid or hydrochloric acid. Any residual free acid can be washed from the ion-exchange material with water.

In producing the cation-free silica sol, a single bed of cation-exchange material can be employed, or a plurality of beds arranged in series or in parallel, or both, can be used. When beds are employed in series, it is advantageous to feed the fresh silicate solution to the most nearly spent bed of cation-exchange material with a substantially cation-free silica sol emanating from the most recently regenerated bed of ion-exchange material. Regeneration is accomplished by acid washing, as described above, for the initial preparation of the ion-exchange material. To determine when a bed is spent, it is convenient to measure continuously or from time to time the pH or the conducitvity of the effluent silica sol. The pH of a satisfactory sol is in the neighborhood of three, and its specific conductance is in the neighborhood of $10^{-4}$ to $10^{-5}$ ohm$^{-1}$ cm.$^{-1}$. When the pH rises to about five, the processing is preferably interrupted for regeneration of the beds.

The pH of the silica sol is desirably maintained at a level less than five to prevent premature gelation of the sol. As indicated below, dilute, cation-free silica sols are unstable, tending to gel, which tendency is greatly accelerated when the pH is raised. Further, a rise in pH of the effluent silica sol indicates that the ion-exchange bed is no longer functioning efficiently in exchanging protons for cationic impurities. Maintaining the pH at less than five tends to maximize the stability of the silica sol while minimizing the concentration of cationic impurities.

Silica sols, substantially free of cationic impurities, as prepared by other methods can also be employed within the scope of this invention. For example, satisfactory dilute cation-free silica sol can be made by hydrolysis of ethylorthosilicate or of silicon tetrachloride.

"Water glass" is prepared by fusing silica with sodium carbonate, the product is a colloidal suspension of silica in sodium silicate. When this suspension of silica in sodium silicate is treated by passage through a protonated ion-exchange column, the resulting product is an aqueous colloidal suspension of silica and silicic acid having a pH of about three. This silica sol, wherein the colloidal particles of silica and silicic acid are very finely dispersed, is the starting material for this invention. The silica sol in this form is relatively stable in that it does not gel immediately, but on standing, changes akin to polymerization do occur. The colloidal particles become larger and the molecular weight of the silicic acid increases as the chain length grows. This process continues until the material has gelled. It is believed that polymerization is a function of pH, the nature of the impurities, the mobility of the impurities and the mobility of the particles. It has also been found that thermal aging of the silica sol, for example, at temperatures from about 150° F. to 250° F., preferably 180° F. to 200° F., for at least four hours, usually 4 to 24 hours, prior to reaction of the silica sol with iron ions yields a final catalyst having large pores, i.e. a higher average pore radius.

According to the method of this invention, the freshly prepared (which includes thermal aging) silica sols, substantially free of cationic impurities, are preferably mixed promptly with the aqueous solution of the compound that yields the desired Group VIII iron group metal ion in solution. When the silica sol has been freshly prepared, the colloidal particles are very small in size and the molecular weight of the silicic acid is very low. These characteristics of the freshly prepared silica sol permit a near-atomic mixing of the elements to permit interreaction of the silicon, iron group metal and oxygen with the ultimate formation of a polymer of these elements. Furthermore, this procedure results in a final composition with an extremely high surface area, as high as about 350 m.$^2$/g. and higher. Preferred practice is to admix the preferred iron group metal salt, i.e. an aqueous $FeCl_3$ solution to the thermally aged silica sol.

For the practice of this invention, the salt of the Group VIII iron group metal employed must be soluble in the solvent used, for example, water, an alcohol such as methyl alcohol, or other high dielectric constant materials such as dioxane, etc., in order that the iron group metal and silicon can form a cogel when the base is added. Examples of the salts of iron group metals which may be successfully employed in this invention are the nitrates, sulfates, halides, acetates, nitrites, etc., and suitable compounds of cobalt, organometallic nickel and iron.

A list of suitable salts includes, but is not limited to: $FeCl_3$; $Fe(NO_3)_3$; $Fe(NO_3)_2$; $FeCl_2$; $Fe(NO_2)_2$; $FeBr_3$; $Fe(C_2H_3O_2)_3$; $Fe_2(C_2O_4)_3 \cdot 6H_2O$; $FeOCl$; $Fe(SO_4)_3$; $Fe(ClO_4)_3 \cdot 6H_2O$; $NiCl_2$; $NiF_2$; $Ni(NO_3)_2$; $Ni(C_2H_3O_2)_2$; $CoCl_2$; $CoF_2$; and $Co(NO_3)_2$.

The most preferred iron group metal salt for use in the practice of the instant invention is ferric chloride. Ferric chloride is readily soluble in water, is inexpensive, is readily available in quantity, easily forms an insoluble gelatinous precipitate in the presence of basic substances, such as ammonia, thereby readily permitting the desired cogelation and yields a finished catalystic product of outstanding properties. Although a preferred mode of operation is to use the iron group metals in their higher oxidation states, it is within the contemplation of this invention to employ a soluble salt of an iron group metal in its lower oxidation state, form the cogel and then oxidize the metal ion to its higher oxidation state.

When the silica sol is added to the solution of iron group metal cations, mixing should be sufficiently thorough to produce a completely homogeneous liquid. Because cation-free dilute silica sols are unstable, having a tendency to gel, it is essential for superior results, as indicated above, that the silica sol be used soon after its preparation, i.e. within 12 hours, and preferably within one hour after its preparation (which includes thermal aging) as set forth above. As indicated above, the preferred practice is to admix the thermally aged silica sol to an aqueous solution of iron group metal cations. The solution of iron group metal cations will generally contain the cations of only one of the three iron group metals; however, the solution can contain a mixture of the cations of any two or all three of the iron group metals.

Once the mixture has been thoroughly homogenized, gelation is brought about by increasing the pH of the mixture. This may be done conveniently by addition of aqueous ammonia with stirring or addition of gaseous ammonia, as through a sparger. The base chosen for raising the pH of the mixture of silica sol and iron group metal cations should preferably be such as to leave no harmful residue in the resulting composition. The alkali metals and alkali metal hydroxides and such compounds therefore are not generally used for they leave a residue of alkali metal in the product difficult to remove by washing. Ammonia, on the other hand, is inexpensive, easily available, and leaves no residue upon calcination of the resulting gel. Other bases, such as trimethyl ammonium hydroxide, hydrazine or quinolinium hydroxide, can be employed, but they are expensive and are considered to have no particular advantage. When salts of nickel and cobalt and such metals are used as the source of iron group metal cations, ammonia cannot be used to adjust the pH since these metals form complex amines in admixture with ammonia. A convenient means of adjusting the pH, when salts of metals such as nickel or cobalt are used, is to add ammonium bicarbonate.

On addition of the base to the iron group metal cation-silica sol solution, a slurry is formed consisting of a gelatinous precipitate and water. Although this gelatinous precipitate can be removed at will, it is preferred to allow it to stand about 16 hours to assure complete precipitation. The precipitate can be separated from the supernatant liquid in any convenient manner as, for example, by filtration. The precipitate is then washed with water containing low levels of $NH_3$ to remove any contaminants. This washing process advantageously can be continued until conductivity measurements reach a constant level.

Once the precipitate has been washed free of contaminants, it can be dried and calcined. Preferably the washed precipitate is both dried and calcined before the addition of the copper salt, although calcining is not essential at this point but merely preferred. The washed gelatinous precipitate can be dried, for example, in a forced draft oven at a temperature in the range of from 200° F. to 300° F. over a period of from 10 to 30 hours. The dried product can then, if desired, be calcined in air at a temperature from 800° F. to 1000° F. over a period of from 10 to 20 hours, preferably at from about 850° F. to 950° F. for from about 8 to 16 hours, to form the inorganic polymer base for the catalyst of the instant invention.

The copper salt can be added to the dried and optionally calcined inorganic polymer described above by any suitable procedure. Usually the copper salt is added by impregnation from a solution of a suitable copper salt. A sufficient amount of the copper salt should be used to deposit on the finished catalyst from 0.1 to 15 weight percent, preferably from 0.5 to 7 weight percent, of the copper salt based on the total weight of the catalyst. In all cases, the salt concentrations are calculated on the basis the salts are anhydrous, i.e. without the water of hydration. Normally, an aqueous solution of the copper salt is employed, although alcoholic or other high dielectric constant mediums, such as dioxane or dimethyl sulfoxide, can be employed to form copper salt solutions. By a "high dielectric constant material" is meant one having a dielectric constant of over eight at 25° C. Suitable copper salts include copper halides, such as copper chloride, copper bromide, and copper iodide and other suitable salts such as copper nitrate, copper acetate, copper perchlorate and copper tetramine nitrate. The impregnation of the solution of the copper salt onto the inorganic polymer is usually by the method of minimum excess solution or incipient wetness, which is commonly practiced in preparing catalysts by impregnation. Other suitable impregnation technqiues such as vacuum impregnation can be employed. Prior to impregnation, the calcined composite can be, of course, broken up into any convenient size, as, for example, 6 to 10 mesh.

The use of catalysts comprising silicon, oxygen and an iron group metal chemically combined to form an inorganic polymer structure is known in the art for the sweetening of hydrocarbons. (See U.S. Pat. 3,491,020 to Norman L. Carr et al.) The use of copper chloride as a hydrocarbon sweetening catalyst has been known for a much longer period of time. The teachings of Carr et al. suggest the use of various promoting agents including selenium or one of the alkali metals. Absent from the teachings of Carr et al. is any suggestion or teaching that a copper salt can be used as a promoting agent for an inorganic polymer consisting of iron, oxygen and silicon. This may be so since copper salts are not known as promoting agents but rather are sweetening catalysts in their own right. It was therefore surprising to find that the copper salts promoted the inorganic polymers described by Carr et al. and further surprising to find that the promoting effect was only achieved when relatively small amounts of the copper salts were employed. Thus the amount of copper salt to employ can be from 0.1 to 15 weight percent of the total catalyst, with preferred amounts between 0.5 and 7 percent of the total catalyst weight. Higher amounts of the copper salt result surprisingly in no promotion.

The amount of copper to employ should be such that the atomic ratio of copper to the iron group metal is from 0.01:1 to 0.45:1, preferably from 0.01:1 to 0.3:1.

As noted above, the very high surface area catalyst comprising a cogelled chemical composite of an iron group metal salt, oxygen and silicon is a highly effective catalyst for the selective oxidation of thiols to disulfides. The catalytic composite described with reference to iron as the iron group metal is a chemical combination comprising iron, oxygen and silicon in an amorphous, inorganic, high molecular weight polymer-like material containing multiple and random Si—O—Si, Si—O—Fe, and Fe—O—Fe linkages, with each silicon atom directly united to four oxygen atoms and each iron atom directly united to three oxygen atoms. The nature of the catalyst is such that some oxygen is readily available from within the structure for selective oxidation of adsorbed thiols. It is not known for certain whether there is a chemical interaction of the copper salt with the iron in the inorganic polymer structure but it is believed possible that some $CuFe_2O_4$ may be forming. If such is the case it is indeed surprising since the iron is already believed to be chemically combined in an amorphous structure.

Not all concentrations of the iron group metals applicable to the practice of the instant invention can be employed under the process conditions herein set forth. At metal concentrations in excess of about 60 percent by weight, the catalyst demonstrates crystalline characteristics and displays an attendant loss of desirable properties. The iron group metal and silica sol are preferably used in proportions to make the catalytic composite with an atomic ratio of iron group metal to silicon to oxygen within the range of about 1:2:5.5 to about 1:12:25.5. The most preferred catalytic composite contains an iron group metal to silicon to oxygen atomic ratio of about 1:4:9.5. In the oxidized catalytic composite there is sufficient oxygen to fully satisfy the valence requirements of both the iron group metal and the silicon. This invention contemplates the utilization of either one, two or all three iron group metals in the catalyst composite, preferably with a total iron group metal content within the specified proportions.

After the cogelled catalytic composite has been impregnated with the copper salt solution, it can then be dried in any convenient manner and for this purpose a temperature in the range of from 200° F. to 300° F. is used for a period of about 10 to 30 hours. Once the impregnated composite has been dried it can be calcined. The temperature at which the impregnated composite is calcined is suitably from 400° F. to 800° F. for a period of from 4 to 20 hours, preferably from 400° F. to 700° F. for about 16 hours.

The composite has utility as a low temperature oxidation catalyst and an adsorbent for sulfur-containing compounds. In one embodiment, the composite can be used in an improved method for sweetening sour hydrocarbons. More particularly the catalytic composite can be used for selectively oxidizing mercaptan sulfur, which is contained in a hydrocarbon, to form disulfide sulfur at a low temperature.

It has been found that if a petroleum distillate containing mercaptans is subjected, at a suitable temperature, to contact with air or another source of oxygen in the presence of the cogelled catalytic copper containing composite of the process of the instant invention, such mercaptans are converted to alkyl disulfides or other noncorrosive compounds having no offensive odor and the distillate is thus "doctor" negative.

The charge stock which can be sweetened using the catalyst of this invention can be any atmospheric petroleum distillate having a boiling point from about 50° F. to 700° F. This boiling range encompasses petroleum fractions such as liquid petroleum gas to heavy distillate fuel oils. Usually sweetening processes are relegated to the lighter boiling charge stocks such as liquid petroleum gas, gasolines and naphthas. It is one of the advantages of the catalysts of this invention that they are useful for the sweetening of higher boiling petroleum distillates such as heavy distillate fuel oils.

The contact treatment with the catalystic composite described above can be carried out at a temperature as low as 0° F. to 300° F. The preferred temperatures are in the range of from 80° F. to 200° F. The process can be carried out at a pressure ranging from atmospheric to 500 p.s.i.g. The preferred range of pressure is from 25 to 100 p.s.i.g.

When added free oxygen in the form of air or other suitable source is used, it is advantageous to bring the oxygen and the distillate into intimate contact with each other prior to contact with the catalyst. The purpose of this oxygen addition is to replenish the structural oxygen removed from within the catalyst during the oxidation reaction. The catalytic composite contains sufficient chemisorbed or matrix oxygen within its structure which is available for sweetening to permit at least one complete cycle of a practical size without the addition of any oxygen whatever to the feed stock. However, the addition of process oxygen tends to extend the practical working cycle time of the catalyst and reduces the frequency of reactivation. The oxygen concentration of the feed stock may range then, from no oxygen in the feed stock, to that naturally present, to that oxygen concentration resulting from complete saturation of the feed stock with air, or indeed in some cases the amount of air may exceed the saturation limit of the oil. Although one mode of operation, saturating the feed stock with air, is not critical within the contemplation of this invention, this air saturation eliminates any need for such control or metering apparatus as would be necessary if the air or oxygen concentration were critical when supplemental oxygen is used. It is also desirable and necessary for repeated use to subject the composite catalyst to a suitable regeneration treatment for reactivation when it becomes spent.

The catalyst does lose its activity in use, possibly as a result of a reduction in lattice oxygen within the catalyst or gum formation. It is not affected by by-product water. For this reason it is advantageous to employ multiple reactors which are alternately on stream. This permits the reactivation of one catalyst bed while the other or others continue to function. It has been found that the highest catalytic activity is achieved by a short-time activation with air at atmospheric pressure. The main purpose of reactivation is to remove gum and to replenish the oxygen in the lattice structure of the catalyst.

In a general embodiment of this invention, the sour hydrocarbon feed with or without added contact with air is heated. Usually the distillate or the mixture of distillate and air may be preheated to the reaction temperature or the mixture may be heated in the reaction vessel. Alternatively, the distillate may be optionally preheated and passed downflow through the reactor while air or other gas containing free molecular oxygen is passed concurrently with or countercurrently to the distillate charge stock. If the latter procedure is employed, care should be taken not to use excessive amounts of air since this will promote gum formation and thus tend to shorten the cycle life. Preferably the amount of oxygen is 1.5 times that stoichiometrically required to react with the thiols, but amounts from 0.5 to 20 times the stoichiometric quantity have been used.

The distillate and air are passed into the reaction vessel containing the copper catalyst under appropriate conditions of temperature and pressure. The space velocity of the sour distillate is in general dependent upon the properties desired for the final product, the thiol content of the charge stock and the particular temperature chosen. A suitable space velocity is in the range of one to 50 liquid volume hourly space velocity based on the total flow, but the space velocity is usually in the range of from 1 to 10 LVHSV.

The sweetened product together with any excess air is passed from the catalyst bed into a suitable condenser which is maintained at a temperature sufficiently low to condense any distillate vapors. The air is separated from the distillate and a noncorrosive and "doctor sweet" product is recovered. The invention will be further described with reference to the following experimental work.

Example 1

An inorganic amorphous polymer of iron, silicon and oxygen was prepared as follows:

(1) 2610 grams of sodium silicate solution (28.7 percent $SiO_2$) were admixed with 30 liters of $H_2O$ and passed through a bed of 3000 grams of a protonated ion-exchange resin to produce a silica sol (pH 3 to 3.5);

(2) The resin was washed with five liters of $H_2O$ and the washings were added to the silica sol;

(3) The silica sol was thermally aged at 180° F. to 200° F. for 20 hours in order to produce a final gel with a high average pore radius;

(4) 842 grams of $FeCl_3 \cdot 6H_2O$ were dissolved in five liters of water and added to the silicic acid solution;

(5) To the resulting mixture was added with constant mixing, in a flow stream, dilute aqueous ammonia (about 9% $NH_3$) in an amount sufficient to raise the pH of the resulting mixture to 8;

(6) The slurry was let stand overnight and then filtered and the filter cake was washed with water containing 0.0003% $NH_3$. Washing of the filter cake was stopped when conductivity measurements fell to a constant level; and (7) The filter cake was oven dried for 16 hours at 250° F. and then calcined at 900° F. for 16 hours in air.

The catalyst analyzed about 25 percent $Fe_2O_3$ and about 75 percent $SiO_2$.

Example 2

The catalyst of Example 1 was used to sweeten an Ordovician furnace oil containing 410 p.p.m. of mercaptan sulfur. Inspections for the furnace oil are shown on Table I below. The sweetening reaction occurred by passing the furnace oil together with 65 s.c.f. of air per barrel upflow at 150° F., 50 p.s.i.g. and a 4.5 liquid volume hourly space velocity through a bed of the catalyst. The sweetening activity was determined by testing the product oil at two-hour intervals using the doctor test (ASTM Test D–484) that is sensitive for detecting thiol sulfur concentrations of greater than about three p.p.m. in the product. The product was doctor sweet for four hours or 18 volume throughput.

TABLE I.—ORDOVICIAN FURNACE OIL AND HEAVY DISTILLATE FUEL OIL INSPECTIONS

| Inspection | Ordovician furnace oil | Heavy distillate fuel oil |
|---|---|---|
| Gravity, °API | 43.9 | 40.4 |
| Viscosity, SUV, 100° F | | 37.3 |
| Viscosity, SUS, 100° F | 33.1 | |
| Flash, P-M, ° F | 140 | 194 |
| Pour point, ° F | −10 | +15 |
| Color, ASTM D–1500 | | 0.5 |
| Color, Saybolt D156 | +14 | |
| Total sulfur, weight, percent | 0.11 | 0.12 |
| Mercaptan sulfur, p p m | 410 | 394 |
| Total acid number, ASTM D–974 | <0.03 | 0.01 |
| Aniline point, ° F | | 175 |
| Distillation, ASTM D–86: | | |
| Overpoint, ° F | 321 | 428 |
| Endpoint, ° F | 617 | 626 |
| 10% at, ° F | 385 | 500 |
| 50% | 463 | 550 |
| 90% | 573 | 592 |

A series of catalysts was made by impregnating the dried and calcined catalyst of Example 1 by the method of minimum excess solution (incipient wetness) using various promoting agents. The impregnated catalysts were oven dried at 250° F. for 16 hours and then calcined in air at 600° F. for 16 hours. Each of these catalysts was used to sweeten the same Ordovician furnace oil in the same manner as Example 2 above. The results are shown in Table II below.

TABLE II

[Feed: Ordovician furnace oil as shown on Table I; Conditions: 150° F.: 50 p. s. i. g. 4 5 LVHSV. and about 65 s.c.f.air/bbl.]

| Example No. | Catalyst of Example 1 promoted with, percent by wt. | Sweet product throughput, vol./vol. |
|---|---|---|
| 2 | None | 18 |
| 3 | 2% W, 0 85% K | 0 |
| 4 | 2% $CrO_3$ (1% Cr) | 9 |
| 5 | 2.1% $Ag_2O$ (2% Ag) | 9 |
| 6 | 2.5% $BaO_2$ (2% Ba) | 9 |
| 7 | 6% $K_2O$ (5% K) | 36 |
| 8 | 4% $CuCl_2$ | 268+ |
| 9 | 2.4% $K_2O$ (2% K) | 0 |

Referring to Table II, it can be seen that $CuCl_2$ is surprisingly effective as a promoter.

A second series of catalysts was made by impregnating the catalyst of Example 1 by the method of minimum excess solution using various promoting agents. Each of these catalysts was used to sweeten a heavy distillate fuel oil having 394 p.p.m. of thiol (mercaptan) sulfur. The inspections of the fuel oil are shown on Table I above. The results of the runs are shown on Table III below.

TABLE III

[Feed: Heavy distillate fuel oil as shown on Table I above; Conditions: 150° F.; 50 p.s.i.g.; 4 5 LVHSV; and about 65 s.c.f. air/bbl.]

| Example No. | Catalyst of Example 1 promoted with, percent by wt. | Sweet product throughput, vol./vol. |
|---|---|---|
| 10 | 4% $CuCl_2$ | 108+ |
| 11 | 2% $Cl_2$ | 0 |
| 12 | 1.2% $K_2O$ (1% K) | 0 |
| 13 | 4% $ZnCl_2$ (2% Zn) | 0 |
| 14 | None [1] | 9 |
| 15 | 4% $CuCl_2$ on Catalyst 14 | 162 |

[1] Prepared same as catalyst for Example 1 except that desired composition was 79% $SiO_2$.

Example 16

Example 10 was repeated except the catalyst was four percent $CuCl_2$ on silica gel. The silica gel had the following inspections: BET surface area was 320 m.²/g.; pore vol. of 0.99 cc./g.; average pore radius of 73 A, and an Fe content of 0.018%. The sweet product throughput was 18 vol./vol.

Example 17

The four percent $CuCl_2$ catalyst of Example 8 was employed for sweetening of a light FCC gasoline having 25 p.p.m. of mercaptan sulfur under the same conditions as Example 8. The volume throughput was 1,476 when shut down, and the catalyst was still active.

A series of different charge stocks was sweetened using the catalyst of Example 8 under the same conditions as Example 8 except the space velocity was increased to nine. The results are shown in Table IV below.

TABLE IV.—DIFFERENT FEED STOCKS SWEETENED USING CATALYST OF EXAMPLE 8

[Conditions: 150° F., 50 p.s.i.g., 9 LVHSV v./v./hr., 65 s.c.f. air/bbl.]

| Ex. No. | Feed stock | Mercaptan sulfur, p.p.m. | $H_2S$, percent by wt. | Water, p.p.m. | Best doctor sweet throughput, vol./vol |
|---|---|---|---|---|---|
| 18 | Light FCC gasoline | 25 | | 65 | [1] 1,476+ |
| 19 | Heavy FCC gasoline | 12 | | 89 | [1] 1,925+ |
| 20 | Hydrobon reactor charge | 64 | [2] 0.06 | 79 | 216+ |
| 21 | Prefractionator bottoms | 181 | <0.001 | 127 | 216+ |
| 22 | Weathered gasoline | 878 | 0.02 | 478 | 198 |
| 23 | Ordovician furnace oil | 410 | | | [1] 1,200+ |
| 24 | Heavy distillate fuel oil | 394 | | 234 | 90 |
| 25 | Pentane | 97 | | | [3] 972+ |

[1] 4.5 LVHSV.
[2] Added.
[3] 128° F.; 30 p.s.i.g.; 9 LVHSV, volumes of $C_5$ per volume of catalyst per hour.

Referring to Table IV, it can be seen the various charge stocks are satisfactorily sweetened to very high throughputs even in the presence of $H_2S$ and water.

A series of catalysts were made the same as Example 10 except varying amounts of $CuCl_2$ from 1–20 weight percent were impregnated onto the ferric silicate. These catalysts were tested for the sweetening of the same heavy distillate fuel oil whose inspections are shown on Table I above. The composition of these catalysts and the results of the runs are shown in Table V below.

TABLE V

[Feed: Heavy distillate fuel oil as shown on Table I above; Conditions of treatment: 150° F.; 50 p.s.i.g.; 4.5 LVHSV; and about 65 s.c.f. air/bbl.]

| Example No. | Catalyst of Example 1 promoted with $CuCl_2$, percent by weight | Cu/Fe ratio | Sweet product throughput, vol./vol. |
|---|---|---|---|
| 26 | 0 | 0 | 18 |
| 27 | 1 | 0.024 | 90 |
| 28 | 2 | 0.047 | 126 |
| 29 | 4 | 0.095 | 90 |
| 30 | 10 | 0.237 | 54 |
| 31 | 20 | 0.475 | 18 |

Referring to the above Table V, it can be easily seen the optimum amount of $CuCl_2$ is at about the two weight percent level which was surprisingly low. In fact, at the 20 weight percent $CuCl_2$ level, the catalyst was performing as though the $CuCl_2$ were not present.

Resort may be had to such variations and modifications as fall within the spirit of the invention and the scope of the appended claims.

We claim:

1. A process for the oxidative sweetening of sour hydrocarbons which comprises contacting said sour hydrocarbons under sweetening conditions with a calcined cogelled catalytic composite comprising an iron salt, silicon, oxygen and a copper salt, said composite being prepared by the steps of:

forming a solution of a substantially alkali metal-free silica sol and an iron salt;
cogelling said solution to form a gelatinous precipitate;
drying said gelatinous precipitate;
impregnating said dried gelatinous precipitate with an aqueous solution of a copper salt to deposit thereon from 0.1 to 15 weight percent of said copper salt;
drying said copper containing precipitate;
and thereafter calcining said dried copper containing precipitate, the amount of said alkali metal-free silica sol, said iron salt and said copper salt being such that the iron to silicon to oxygen atomic ratio in the final product is from about 1:2:5.5 to about 1:12:25.5, and the atomic ratio of the copper to iron is from 0.1:1 to 0.45:1.

2. A process according to claim 1 wherein the sour hydrocarbon is contacted with said composite in the added presence of a gas containing free molecular oxygen.

3. A process according to claim 2 wherein the proportion of iron salt to silica sol is selected to result in a final product having an iron to silicon to oxygen atomic ratio of about 1:4:9.5; an atomic ratio of copper to iron from 0.01:1 to 0.3:1 and wherein the amount of iron is from about 10 to about 60 weight percent of said composite.

4. A process according to claim 3 wherein the sweetening conditions include a temperature from about 0° F. to about 300° F. and a pressure from about 0 to about 500 p.s.i.g.

5. A process according to claim 4 wherein said sour hydrocarbon is a distillate boiling from 50° F. to 700° F.

6. A process according to claim 1 wherein the copper salt is copper chloride and is impregnated onto said dried gelatinous precipitate by the method of minimum excess solution.

7. A process according to claim 6 wherein the silica sol solution is formed and thermally aged at a temperature from 150° F. to 250° F. for 4 to 24 hours before it is admixed with the aqueous ferric chloride.

8. A process in accordance with claim 1 wherein said dried gelatinous precipitate is calcined before impregnation with an aqueous solution of a copper salt.

9. A process in accordance with claim 8 wherein the sour hydrocarbon is contacted with said composite in the added presence of a gas containing free molecular oxygen.

10. A process according to claim 9 wherein the copper salt is copper chloride and wherein the proportion of iron salt to silica sol is selected to result in a final product having an iron to silicon to oxygen atomic ratio of about 1:4:9.5; an atomic ratio of copper to iron from 0.01:1 to 0.3:1 and wherein the amount of iron is from about 10 to about 60 weight percent of said composite.

References Cited
UNITED STATES PATENTS

| | | | |
|---|---|---|---|
| 3,491,020 | 1/1970 | Carr et al. | 208—189 |
| 2,042,054 | 5/1936 | Hoover | 208—191 |
| 2,080,365 | 5/1937 | Von Fuchs et al. | 208—191 |
| 3,076,858 | 2/1963 | Frevel et al. | 252—474 |
| 3,617,518 | 11/1971 | Sinfelt et al. | 252—474 |

DELBERT E. GANTZ, Primary Examiner

G. J. CRASANAKIS, Assistant Examiner

U.S. Cl. X.R.

252—452

UNITED STATES PATENT OFFICE
CERTIFICATE OF CORRECTION

Patent No. 3,741,888    Dated June 26, 1973

Inventor(s) Harold Beuther, Sun W. Chun, Harry A. Hamilton and Howard G. McIlvried It is certified that error appears in the above-identified patent and that said Letters Patent are hereby corrected as shown below:

Col. 8, line 62, and Col. 9, line 7, in each instance "45" should be --4.5--;

Column 9, line 23, after "A" and before the comma, a period -- (.) -- should be inserted.

Signed and sealed this 26th day of March 1974.

(SEAL)
Attest:

EDWARD M. FLETCHER, JR.
Attesting Officer

C. MARSHALL DANN
Commissioner of Patents